April 24, 1945. J. R. KERRY 2,374,437
FLUID PULSATOR
Filed June 12, 1942

Inventor:
John R. Kerry,
By Dawson Ormsby Brott
Attorneys.

Patented Apr. 24, 1945

2,374,437

UNITED STATES PATENT OFFICE 2,374,437

FLUID PULSATOR

John R. Kerry, Palatine, Ill., assignor to The House of Vision, Belgard-Spero, Inc., Chicago, Ill., a corporation of Delaware Application June 12, 1942, Serial No. 446,797

10 Claims. (Cl. 137—145)

This invention relates to a fluid pulsator, and more particularly to a pulsator for converting a steady flow of fluid medium under constant pressure into a pulsating current or flow of the desired frequency.

An object of the invention is to provide a device for periodically interrupting the flow of fluid medium from a constant pressure source to provide a pulsating current of the medium. Another object is to provide in a fluid pulsator, means for releasing the pressure in the line of the pulsator when the flow of medium therethrough is interrupted. Still another object is to provide a pulsator mechanism for selectively varying the frequency of the pulsations of fluid medium which are produced.

Another object of the invention is to provide a mechanism wherein the flow of fluid medium from a pressure source is interrupted and, simultaneously with the interruption of the flow, the pressure is released in the line of the pulsator, and in the same mechanism to provide a structure wherein the pressure in the line of the pulsator is used to operate the same. Yet another object is to provide a toggle mechanism for eliminating any lag in the shifting of the valve mechanism by which the pulsations are produced. A further object is to provide in a fluid pulsator, a cylinder receiving the pressure of the line of the pulsator to operate the same, and an auxiliary valve for controlling the flow of medium to and from the cylinder and thereby to regulate the frequency of the pulsations.

Other features and advantages will appear from the following specification and drawing, in which—

Figure 1:
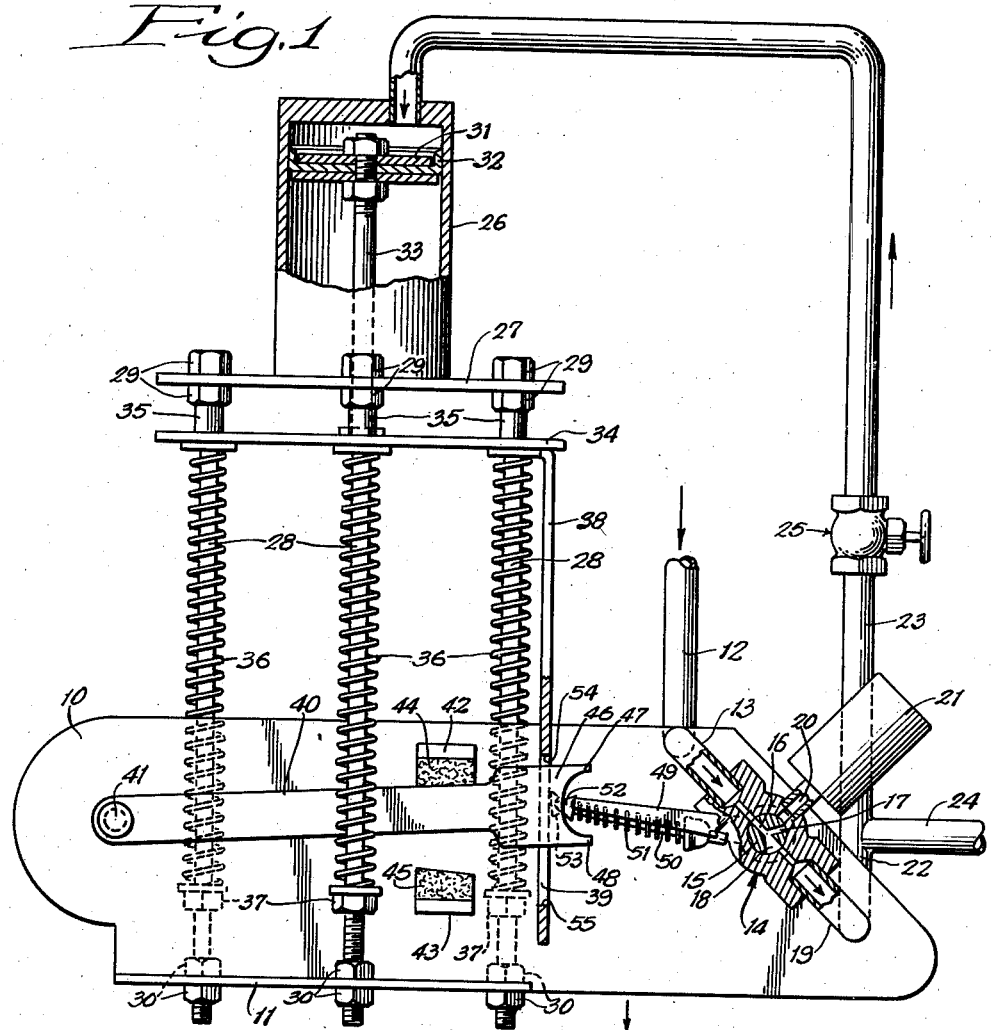
Figure 2:
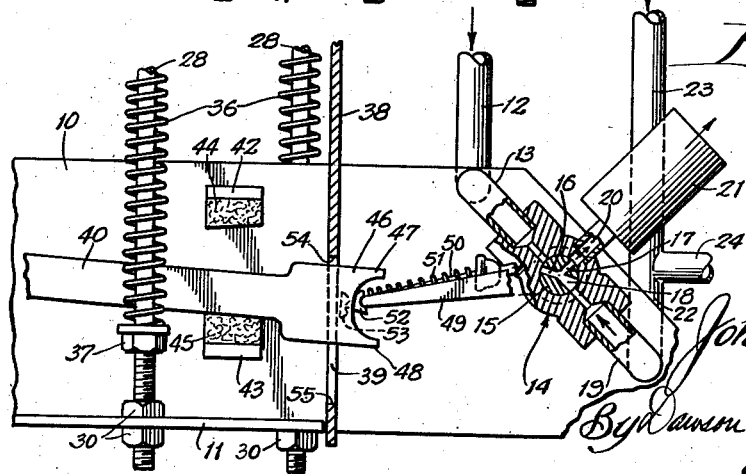

Fig. 1 is a side elevational view, partly in section, showing the pulsator mechanism; and Fig. 2 is a fragmentary view, similar to Fig. 1 but showing the toggle mechanism and main valve in a different position.

The invention contemplates the conversion of a flow of fluid medium under constant pressure into a pulsating current or stream of the medium wherein the pressure in the line of the pulsator is released between impulses. With this device, it is possible to operate a pump or the like which is actuated by a pulsating current of fluid medium and in which the pressure must be released between impulses of the medium. In accordance with the invention, the pulsator will produce impulses of fluid medium of any desired frequency.

In the specific embodiment of the invention described herein, the pulsator includes a frame 10 equipped with a transverse plate 11 at the lower portion thereof, the frame being supported in any suitable manner (not shown). An intake conduit 12 carrying a source of fluid medium, preferably under constant pressure, communicates with the small conduit 13 which leads to the valve 14. The valve 14 is provided with a rotatable core 15 which is equipped with a passage 16 extending therethrough and with a second passage 17 communicating with the passage 16 at an angle thereto, the angle between the passages preferably being in the neighborhood of 60°. At one end 18, the passage 16 is broadened to provide communication between the passage 16 and the conduit 19 in each of the two positions to which the valve may be shifted. The valve 14 is also provided with an outlet passage 20 leading to an escape baffle 21. The conduit 19 communicates with an outlet conduit 22 which receives the pulsating stream of fluid medium provided by the valve.

When the valve is in the position shown in Fig. 1, the fluid medium under constant pressure is introduced through the conduit 12, then through the conduit 13, then through the passage 16, into the conduits 19 and 22. When the valve is shifted to the position shown in Fig. 2, the passage from the conduit 13 is closed so that the fluid medium may not enter the valve, and the outlet passage 20 is brought into communication with the conduit 19 through the enlarged portion 18 of the passage 16 and the passage 17 in the valve 14. In this way, the pressure in the conduits 19 and 22 is relieved by escape of the medium through the escape baffle 21.

Conduits 23 and 24 communicate with the conduit 22, the conduit 24 leading to a pump (not shown) or other means for utilizing the pulsating stream of fluid medium, and the conduit 23 leading through a controlling valve 25 of conventional construction to a cylinder 26. The cylinder 26 is supported upon a plate 27, which in turn is mounted upon the bolts 28 carried by the transverse plate 11 on the frame 10. Suitable lock nuts 29 may be used to secure the bolts 28 to the plate 27, and similar lock nuts 30 secure the bolts 28 to the plate 11 on the frame 10. Preferably, the bolts 28 are disposed laterally with respect to each other in the form of a triangle so as to provide a substantial support for the cylinder mechanism.

Within the cylinder 26 is a piston 31 of any construction suitable for providing a fluid-tight seal within the cylinder. Preferably, the piston is equipped with packing 32 or other sealing means. To the piston 31 may be secured a shaft 33, which in turn extends through the lower end of the cylinder and is carried by the plate 34.

The plate 34 is equipped with openings for slidably receiving the bolts 28 and may also be provided with sleeves 35 for spacing the plate 34 from the plate 27. Springs 36 about the bolts 28 engage the undersurface of the plate 34 and urge the plate upwardly, the lower ends of the springs being in engagement with the nuts 37 on the bolts 28. The plate 34 is equipped with a depending arm 38 secured thereto and extending downwardly along the frame 10. The arm 38 is provided with a notch 39 open at one side within which is received an arm 40 of a toggle mechanism, the arm 40 being pivotally mounted at 41 on the frame 10. A pair of stop lugs 42 and 43, preferably equipped with resilient pads 44 and 45 respectively, are arranged to limit the vertical movement of the arm 40.

The arm 40 of the toggle mechanism is preferably equipped with an enlarged head 46 which is adapted to be engaged at the upper and lower edges by the arm 38. The head 46 on the arm 40 is preferably equipped with a bifurcated portion providing jaws 47 and 48 for engaging an arm 49 which is secured to the core 15 of the valve 14.

A rod 50 carrying a spring 51 and equipped at its end with a head 52 is adapted to exert pressure on the arm 40 toward the pivot 41. The toggle arm 40 is equipped with a lug 53 for receiving the head 52 on the rod 50.

In operation, the fluid medium is received in the conduit 12 under constant pressure from any suitable source (not shown). The fluid medium passes through the conduit 13 and, as seen in Fig. 1, flows through the passage 16 of the valve member 14 into the conduit 19 and thence to the conduits 22, 23 and 24. From the conduit 24, the fluid medium is delivered to a pump or other means for utilizing the pulsating current of fluid medium. The fluid medium passing through the conduit 23 passes into the cylinder 26 and exerts a downward pressure on the piston 31, forcing the piston and the plate 34, to which it is secured, downwardly against the urging of the springs 36.

When the piston 31 is moved downwardly in the cylinder 26, the depending member 38 carried by the plate 34 also moves downwardly until the wall 54 at the upper portion of the notch 39 in the member is brought into engagement with the enlarged head of the toggle arm 40. The member 38 continues to move downwardly and carries the arm 40 downwardly until the arm 40 is downwardly inclined with respect to the pivot 41, at which point the urging of the spring 51 causes the arm 40 to snap quickly to the lower position shown in Fig. 2. The jaw 47 of the head 46 on the arm 40 is not brought into engagement with the arm 49 connected to the core of the valve member until the arm 40 is about to be quickly snapped into its lower position.

When the arm 40 is moved to the lower position shown in Fig. 2, the core 15 of the valve 14 is shifted to the position shown in Fig. 2 wherein the fluid medium introduced through the conduits 12 and 13 is prevented from passing through the valve member, and the passages 18 and 17 communicate respectively with the conduit 19 and passage 20 to permit the pressure in the conduit 19 to be released by escape of the medium through the baffle 21.

As soon as the pressure is released in the conduit 19, the pressure in the line 24 of the pulsator is released, and also the pressure in the conduit 23 is released. This releases the pressure on the piston 31 in the cylinder 26 and permits the springs 36 to urge the plate 34 and piston 31 carried thereby upwardly toward the position shown in Fig. 1. When the plate 34 is moved upwardly, the member 38 is moved until the wall 55 at the lower portion of the notch 39 is brought into engagement with the head 46 of the toggle arm 40. Further upward movement of the member 38 causes the arm 40 to be moved upwardly until it is in a position wherein it is inclined upwardly with respect to the pivot 41, at which point the spring 51 quickly snaps the arm 40 to its upward position shown in Fig. 1. The arm 49 is not engaged by the jaw 48 until the arm 40 is about to be snapped to upward position. When the toggle arm 40 is moved to upward position, the core 15 of the valve member 14 is shifted to the position shown in Fig. 1, and pressure is again established in the line 24 and in the conduit 23. This permits pressure to be exerted on the piston 31 in the cylinder 26, and the operation is repeated.

The frequency of the interruption of the flow of fluid medium may be controlled by means of the valve 25, which controls the flow of fluid medium into and out of the cylinder 26. When the valve is adjusted to permit only a small amount of medium to pass therethrough, it will require a considerable period of time for sufficient pressure to be exerted on the piston 31 to move it to its lower position. Similarly, if the medium escapes through the valve 25 only at a very slow rate, the pressure will not be released rapidly in the cylinder 26, and the piston 31 will be moved upwardly by springs 36 only at a very slow rate.

Any suitable type of fluid medium may be used with the pulsator, although compressed air is normally to be preferred. Preferably, the source of fluid medium is accurately controlled so that the medium is delivered to the conduit 12 under substantially constant pressure.

Although the invention has been described in connection with a specific embodiment, it will be understood that this is for the purposes of illustration only and that changes and modifications may readily be made without departing from the spirit and scope of the invention.

I claim:

1. A fluid pulsator, comprising a source of fluid medium, an outlet conduit for receiving said fluid medium and so constructed that pressure is capable of being built up therein, valve means interposed between said source and said outlet conduit, said valve means in one position providing communication between said source and said conduit so as to permit the building up of pressure in said conduit and in another position interrupting said communication and simultaneously providing an outlet for releasing pressure in said outlet conduit, conduit means for withdrawing fluid from said outlet conduit in response to fluid pressure within said outlet conduit, means actuated by a predetermined amount of the fluid withdrawn by said conduit means for moving the valve means to the latter position, and means for automatically moving the valve means to the former position when the fluid pressure in the outlet conduit is released.

2. A fluid pulsator, comprising a source of fluid medium, an outlet conduit for receiving said fluid medium and so constructed that pressure is capable of being built up therein, valve means interposed between said source and said outlet conduit, said valve means in one position providing communication between said source and said conduit so as to permit the building up of pressure in said conduit and in another position interrupting said communication and simultaneously providing an outlet for releasing pressure in said outlet conduit, toggle mechanism for shifting the valve means from one position to the other, means operated by the fluid pressure in the outlet conduit for actuating the toggle mechanism to shift the valve means and interrupt said communication, and means, operative when the pressure is released in the outlet conduit, for automatically actuating the toggle mechanism to shift the valve means and bring said source into communication with said conduit.

3. A fluid pulsator, comprising a source of fluid medium, an outlet conduit for receiving said fluid medium and so constructed that pressure is capable of being built up therein, valve means interposed between said source and said outlet conduit, said valve means in one position providing communication between said source and said conduit so as to permit the building up of pressure in said conduit and in another position interrupting said communication and simultaneously providing an outlet for releasing the pressure in said outlet conduit, toggle mechanism for shifting the valve means from one position to the other, a cylinder communicating at one end with said outlet conduit, a piston supported in fluid-tight engagement with the inside of the cylinder and mounted for reciprocation therein, said piston being connected to the toggle mechanism whereby, when the piston is advanced, the toggle mechanism is actuated and the valve means is shifted to said last-mentioned position, and means, for continuously urging the piston to its original position whereby when the pressure is released in the outlet conduit the piston is returned to its original position and the toggle mechanism actuated to shift the valve means to said first-mentioned position.

4. A fluid pulsator, comprising a source of fluid medium, an outlet conduit for receiving said fluid medium and so constructed that pressure is capable of being built up therein, valve means interposed between said source and said outlet conduit, said valve means in one position providing communication between said source and said conduit so as to permit the building up of pressure in said conduit and in another position interrupting said communication and simultaneously providing an outlet for releasing the pressure in said outlet conduit, toggle mechanism for shifting the valve means from one position to the other, a cylinder communicating at its head with said outlet conduit, a piston supported in fluid-tight engagement with the inside of the cylinder and mounted for reciprocation therein, said piston being connected to said toggle mechanism whereby, when the piston is advanced from the head of the cylinder by pressure in said outlet conduit, the toggle mechanism is actuated and the valve means is shifted to said last-mentioned position, and spring means for urging the piston toward the head of the cylinder whereby, when the pressure is released in the outlet conduit, said piston moves toward the head of the cylinder and the toggle mechanism is actuated to shift the valve means to said first-mentioned position.

5. A fluid pulsator, comprising a source of fluid medium, an outlet conduit for receiving said fluid medium and so constructed that pressure is capable of being built up therein, valve means interposed between said source and said outlet conduit, said valve means in one position providing communication between said source and said conduit so as to permit the building up of pressure in said conduit and in another position interrupting said communication and simultaneously providing an outlet for releasing the pressure in said outlet conduit, toggle mechanism for shifting said valve means from one position to the other, a conduit communicating with said outlet conduit and with a pressure cylinder, a piston supported in fluid-tight engagement with the inside of said cylinder and mounted for reciprocation therein, said piston being connected to said toggle mechanism whereby, when the piston is advanced by pressure in said outlet conduit, the toggle mechanism is actuated and the valve means is shifted to said last-mentioned position, means, for continuously urging the piston toward its original position whereby when pressure is released in the outlet conduit said piston moves toward its original position and the toggle mechanism is actuated to shift the valve means to said first-mentioned position, and adjustable valve means in the conduit communicating with the cylinder for controlling the flow of fluid meduim to and from the cylinder for regulating the frequency of the shifting of position of said first-mentioned valve means.

6. A fluid pulsator, comprising a constant pressure source of compressed air, an outlet conduit for receiving the air and so constructed that pressure is capable of being built up therein, a movable valve member interposed between said source and said conduit, said member in one position providing communication between said source and said conduit so as to permit the building up of pressure in said conduit and in another position interrupting said communication and providing an outlet for releasing the pressure in said conduit, toggle mechanism for engaging said valve member to shift the same from one position to the other, an auxiliary conduit communicating with said outlet conduit, a cylinder connected at its head to said auxiliary conduit, a piston received within said cylinder in air-tight relation therewith and mounted for reciprocating movement therein, said piston being connected in operative relation with said toggle mechanism whereby, when the piston is advanced in the cylinder by pressure in said outlet conduit, the toggle mechanism is actuated to shift the valve member to said last-mentioned position, and when the piston is returned to the head of the cylinder, the toggle mechanism is actuated to shift the valve member to said first-mentioned position, spring means for urging the piston toward the head of the cylinder against the pressure of air admitted through the auxiliary conduit, said spring means exerting on the piston less pressure than the air admitted through the auxiliary conduit whereby the piston is moved to the head of the cylinder only when the pressure is released in the auxiliary conduit, and an adjustable valve member in the auxiliary conduit for controlling the rate of flow of air to and from the cylinder whereby the frequency of the pulsator may be varied.

7. A pulsator comprising a source of gaseous medium, an outlet conduit for receiving said gaseous medium and so constructed that pressure is capable of being built up therein, valve means interposed between said source and said outlet conduit, said valve means in one position providing communication between said source and said conduit so as to permit the building up of pressure in said conduit and in another position interrupting said communication and simultaneously providing an outlet for instantaneously releasing pressure in said outlet conduit, conduit means for withdrawing gas from said outlet conduit in response to gas pressure within said outlet conduit, means actuated by a predetermined amount of the gas withdrawn by said conduit means for moving the valve means to the latter position, means for automatically moving the valve means to the former position when the gas pressure in the outlet conduit is released, and adjustable means for controlling the frequency of the movement of the valve means from one position to the other.

8. A pulsator comprising a source of gaseous medium, an outlet conduit for receiving said gaseous medium and so constructed that pressure is capable of being built up therein, valve means interposed between said source and said outlet conduit, said valve means in one position providing communication between said source and said conduit so as to permit the building up of pressure in said conduit and in another position interrupting said communication and simultaneously providing an outlet for instantaneously releasing pressure in said outlet conduit, means actuated by the gas pressure in the outlet conduit for moving the valve means to the latter position, and spring means compressed by said gas pressure for moving the valve means to the former position when the gas pressure in the outlet conduit is released.

9. A fluid pulsator comprising a source of fluid, an outlet conduit for receiving said fluid, valve means interposed between said source and said outlet conduit, valve means which in one position provides communication between said source and said conduit and which in another position interrupts said communication and provides an outlet for fluid from said conduit, and means for controlling the positioning of said valve means, said control means including a conduit in communication with said outlet conduit and having a restriction therein which restriction controls the rate of flow of fluid into said control means from said outlet conduit when said valve means is in said one position, and means operable when a predetermined quantity of fluid passes from said outlet conduit through said restriction for shifting said valve means to said last-mentioned position.

10. A fluid pulsator as set forth in claim 9 including means for adjusting said restriction to permit a greater or lesser flow of fluid therethrough at a given outlet conduit pressure so as to permit adjustment of the interval of fluid flow.

JOHN R. KERRY.